Oct. 12, 1965   R. W. McCLENNY   3,211,238
EXTENDED CULTIVATOR FRAME
Filed July 5, 1963   2 Sheets-Sheet 1
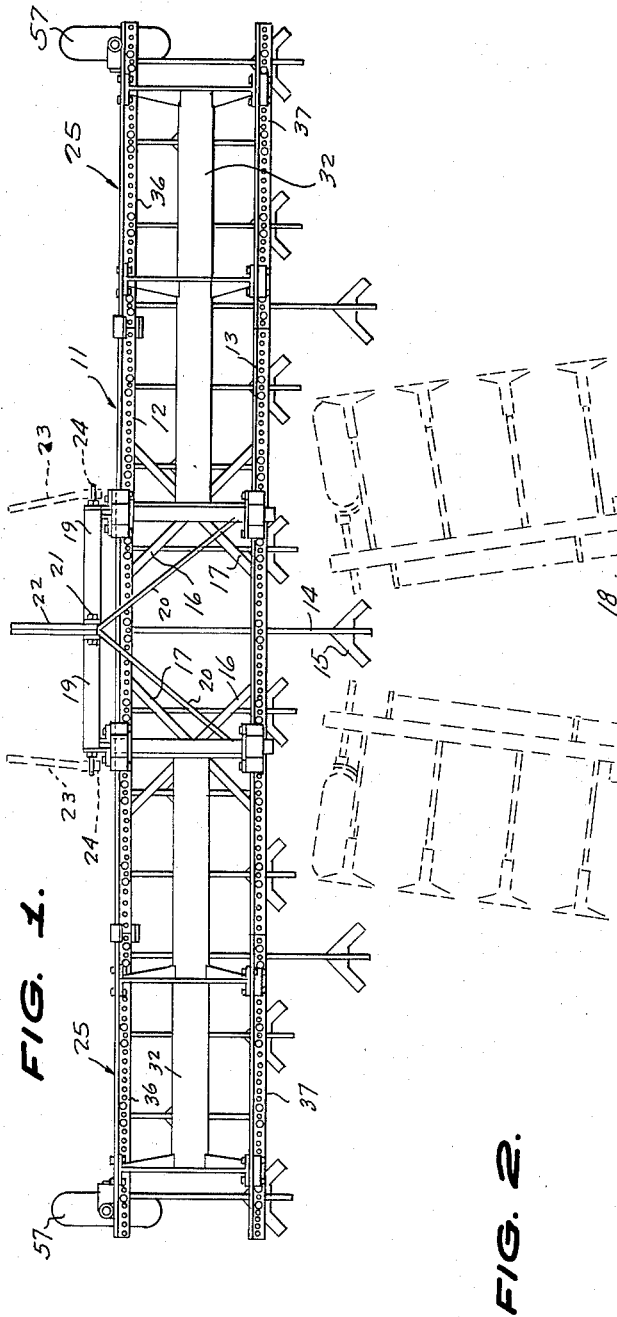
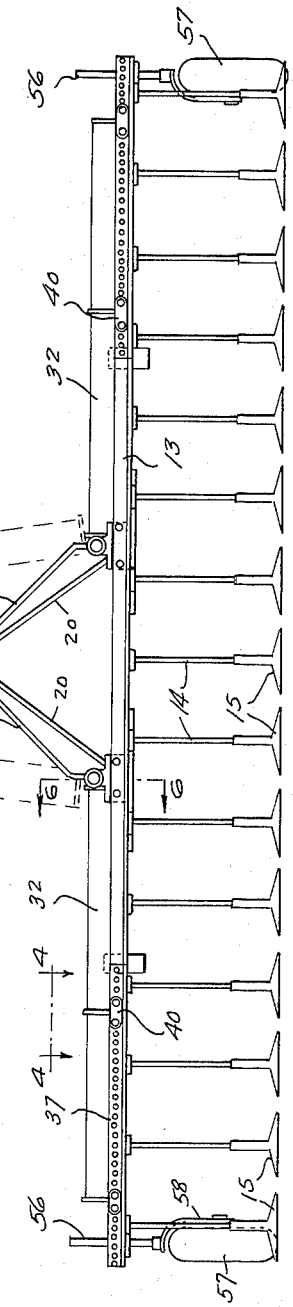
INVENTOR.
ROBERT W. McCLENNY,
BY
McMorrow, Berman & Davidson
ATTORNEYS.

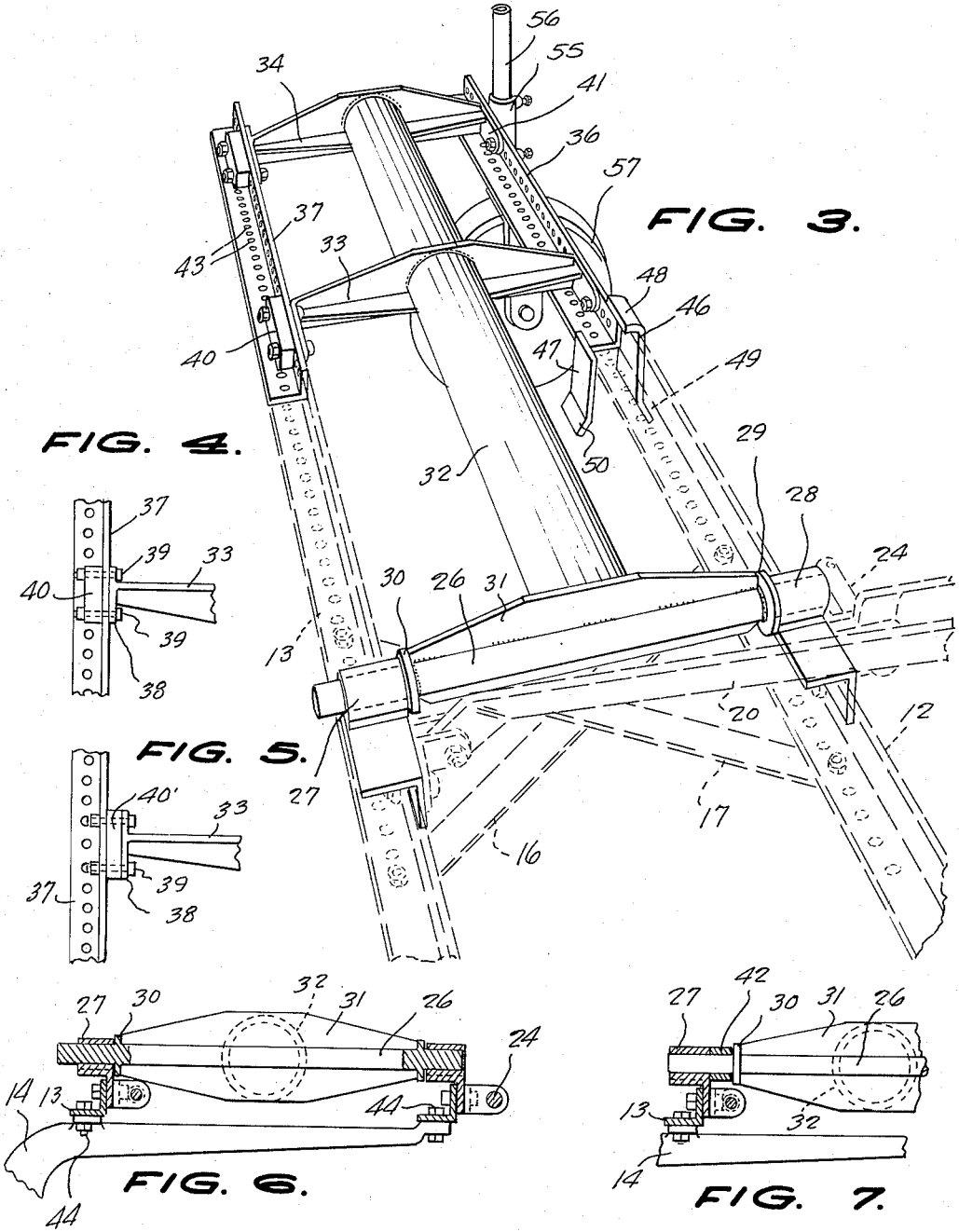

United States Patent Office 3,211,238
Patented Oct. 12, 1965

3,211,238
EXTENDED CULTIVATOR FRAME
Robert W. McClenny, P.O. Box 1206,
Nansemond County, Va.
Filed July 5, 1963, Ser. No. 292,957
7 Claims. (Cl. 172—456)

This invention relates to agricultural equipment, and more particularly to cultivator frames.

The main object of the invention is to provide a novel and improved extension kit assembly for use in extending the width of a standard cultivator frame, the extension kit assembly involving relatively simple parts, being easy to install, and being adjustable so that it may be mounted on several different standard types of existing cultivator frames.

A further object of the invention is to provide an improved extension kit for extending the width of a cultivator frame, said kit involving relatively inexpensive components, being durable in construction, and being provided with means for folding the extension components upwardly when not in use so as to reduce the width of the cultivator machine, when required, for example, to allow the machine to travel over a highway or in other restricted areas.

Further objects and advantages of the invention will become apparent from the following description and claims, and from the accompanying drawings, wherein:

FIGURE 1 is a top plan view showing a cultivator frame provided with an extension kit assembly according to the present invention, shown in operating position.

FIGURE 2 is a rear elevational view of the extended frame assembly of FIGURE 1.

FIGURE 3 is a perspective fragmentary view of one side portion of the cultivator frame extension kit of the present invention, shown in relation to the cultivator frame on which it is to be mounted, the existing cultivator frame being shown in dotted view.

FIGURE 4 is an enlarged fragmentary top plan view taken substantially on the line 4—4 of FIGURE 2.

FIGURE 5 is an enlarged top plan view similar to FIGURE 4, but showing a rearrangement wherein the transverse width of the frame extension is increased as over the condition illustrated in FIGURES 1 and 4, whereby the extension kit may be employed with a different type of existing cultivator frame.

FIGURE 6 is an enlarged fragmentary cross sectional view taken substantially on the line 6—6 of FIGURE 2.

FIGURE 7 is a fragmentary vertical cross sectional view similar to FIGURE 6, but showing the inside spacer block employed to provide increased transverse width of the extension, corresponding to the embodiment illustrated in FIGURE 5.

Referring to the drawings, 11 generally designates a conventional cultivator frame of the type comprising a pair of elongated spaced horizontal parallel main tool bars 12 and 13 having apertures to receive attachment rods 14 carrying cultivating blades 15 or other cultivating tools. The depending tool-carrying rods 14 are secured in any suitable manner to the tool bars 12 and 13, so that the blades or tools 15 are supported at the proper distance from the tool bars 12 and 13 for engagement in the soil to the desired depth. The main bars 12 and 13 are rigidly secured in spaced parallel relationship by respective pairs of cross braces 16, 17, and the tool bars 12 and 13 are further connected by a supporting frame 18 comprising a pair of upwardly convergent bar members 19, 19 secured to the front frame bar 12 and another pair of upwardly and forwardly inclined bar members 20, 20 secured to the rear frame bar 13, the top ends of the bars 19, 19 and 20, 20 being connected together at 21, whereby the joined top ends are further connected to the top supporting arm 22 of a standard three-arm tool-supporting structure carried by a tractor. The remaining connecting arms 23, 23 from the associated tractor are pivotally connected to outwardly projecting horizontal trunnion shafts 24, 24 provided on the front frame bar 12, the arrangement of the bars 22 and 23, 23 being such that the frame 11 may be elevated or lowered by the operator of the tractor, and so that the main tool frame 11 is normally supported by the bar members 22 and 23, 23.

The structure thus far described is conventional and in itself forms no part of the present invention, merely representing a typical cultivator frame for which applicant's attachment is applicable.

Designated generally at 25, 25 are respective cultivator frame extensions provided at opposite sides of the main frame 11. Each of the extensions 25 comprises a supporting shaft member 26 which is rotatably mounted at its respective end portions in bearing brackets 27 and 28 which are respectively secured to the main frame bars 13 and 12, thus pivotally supporting the shaft member 26 transversely on the main frame bars 13 and 12, as is shown in FIGURE 3.

As shown in FIGURE 3, the main frame bars 12 and 13 are of right angled cross section and have upstanding flanges, and the bearing brackets 28 and 27 likewise have right angled base portions provided with depending flanges which are secured to the upstanding flanges of the frame bars 12 and 13.

Each shaft member 26 is provided with stop collar elements 29 and 30 inwardly adjacent the bearing brackets 28 and 27, limiting endwise movement of the shaft members, and each shaft member 26 is further provided with a plate-like longitudinal flange 31 extending between the stop collar elements 29 and 30.

Rigidly secured to the intermediate portion of each plate-like flange 31 is an outwardly extending tubular arm 32 which extends parallel to and is substantially midway between the frame bars 12 and 13 and which has rigidly secured to its outer portions the respective transversely extending cross bar elements 33 and 34, extending parallel to the associated shaft member 26. Thus, the tubular support arm 32 extends perpendicular to the associated plate-like flange 31 at the center portion of said flange.

Secured rigidly to the ends of the respective pairs of spaced cross bars 33 and 34 are parallel auxiliary tool bars 36 and 37 which are of right angled cross sectional shape, similar to the cross sectional shape of the main tool bars 12 and 13, and which are located so as to be registrable with the main tool bars when the associated support arm 32 is in a horizontal position. In the arrangement illustrated in FIGURES 1 to 4 and 6 the end flanges 38 on the cross bars 33 and 34 are disposed inwardly adjacent the vertical flanges of the auxiliary frame bars 37 and are secured thereto by transversely extending bolts 39, 39 which pass through the flanges 38, the upstanding flanges of the auxiliary frame bars 37 and through spacer blocks 40 provided externally adjacent to the upstanding flanges of the frame bars 37. The end flanges 41 of the cross bars are likewise secured to the upstanding flanges of the auxiliary frame bars 36 without the provision of any spacer blocks.

The arrangement illustrated in FIGURES 1 to 4 and 6 shows the auxiliary frame bars 36 and 37 spaced apart by a distance corresponding to the spacing between the main frame bars 12 and 13 of one particular commercial model of a cultivator frame. With other models, wherein the spacing between the cultivator frame bars 12 and 13 is somewhat greater, the spacer blocks may be placed between the end flanges 38 of the cross bars and the inside surfaces of the upstanding flanges of the auxiliary frame bars 37, as shown in FIGURE 5, and spacer blocks 40' of the necessary thickness may be employed, as required. When such inside spacer blocks 40' are employed, a spacer collar 42 is employed between the stop collar 30 of the associated shaft member 26 and the associated bearing bracket 27, as shown in FIGURE 7.

The auxiliary frame bars 36 and 37 are provided with the spaced bolt-receiving apertures 43 in their horizontal flanges, as shown in FIGURE 3, adapted to receive the fastening bolts 44 employed to connect auxiliary tool-supporting bars 14 to the auxiliary frame bars, as shown in FIGURE 6.

Rigidly secured to the inner end portions of the auxiliary frame bars 36 are respective opposing guide plates 46 and 47 adapted to receive the ends of the main frame bar 12 therebetween and to guide the frame bars 36 into accurate registry with the end portions of the main frame bar. Thus, the plate member 46 is rigidly secured to the forward surface of the upstanding flange of the associated auxiliary frame bar 36, being provided at its top end with an inturned flange portion 48 engageable with the top edge of the upstanding flange of the main frame bar 12 to limit the downward movement of the associated auxiliary frame bar 36 to a position in registry with the main frame bar. Likewise, the plate-like bracket member 47 is rigidly secured to the inner edge of the horizontal flange of the associated auxiliary frame bar 36 and is substantially parallel to the main body portion of the opposing plate-like bracket member 46, to engage the inner edge of the main frame bar 12 and to assist in accurately registering the auxiliary frame bar 36 with the main frame bar. The platelike bracket members 46 and 47 are provided with downwardly and outwardly inclined bottom flange portions 49 and 50, which diverge downwardly and which assist in guiding the auxiliary frame bar 36 into accurate registry with the main frame bar 12 as the auxiliary frame bar 36 moves downwardly.

Since the opposing auxiliary frame bar 37 is held rigidly with respect to the auxiliary frame bar 36, it will come into accurate registration with the rear main frame bar 13.

Rigidly secured to the outer end portion of each auxiliary frame bar 36 is a bearing sleeve 55 in which is rotatably secured a caster shaft 56 which carries a ground-engaging caster wheel 57 rotatably supported on a wheel bracket 58, whereby the ground-engaging wheel 57 is swivelly journaled to the associated auxiliary tool bar 36.

As shown in FIGURE 2, the supporting wheels 57, 57 are located so as to engage the ground with the tools 15 of the extension attachment supported at the proper elevation to penetrate into the ground to the desired extent, namely, to the same extent as the tools 15 associated with the main cultivator frame 11.

As shown in dotted view in FIGURE 2, the opposite segments 25, 25 may be elevated into upstanding positions and may be suitably attached together by any convenient means to support them in their upstanding positions when the extension segments are not in use. Thus, if so desired, the top ends of the cultivator frame extensions 25, 25 may be connected together by a link bar or any other suitable connecting rod to hold them in elevated out-of-the-way positions, whereby to allow the tractor and the associated cultivator frame 11 to travel over a highway or in any other restricted area. When it is desired to utilize the cultivator frame extensions 25, 25, they are released and allowed to descend to horizontal positions, such as those illustrated in full line view in FIGURES 1 and 2, being guided into registration with the main frame bar members 12 and 13 by the respective pairs of guide plates 46 and 47 provided on the auxiliary frame bar elements 36, being furthermore supported in substantial registration with the frame bars of the main cultivator frame by the ground-engaging supporting wheels 57, 57.

As shown in FIGURE 1, the extensions are preferably mounted symmetrically on the main frame bars 12 and 13 with respect to the vertical longitudial plane of the cultivator frame 11, and the shaft members 26 are preferably mounted adjacent to the connections on the front upwardly converging bar members 19, 19 to the front main frame bar 12. As will be further apparent from FIGURE 1, the shaft members 26, 26 overlie the intersections of the crossed diagonal brace bars 16 and 17, and it will be further apparent that the shaft members 26 cooperate with the crossed brace bars 16 and 17 to further rigidify the connections between the main frame bars 12 and 13.

While a specific embodiment of an improved cultivator frame extension attachment assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A cultivator frame extension attachment for a cultivator frame of the type comprising a pair of elongated spaced horizontal parallel main tool bars having means for supporting depending cultivator tools and adapted to attached to a tractor, said extension attachment comprising at least one supporting shaft member, upstanding longitudinal flange means on the intermediate portion of said shaft member, means for rotatably mounting said shaft member transversely on the intermediate portions of said parallel tool bars, a support arm rigidly secured to said flange means perpendicularly thereto, whereby to extend between said parallel tool bars, spaced bar members rigidly secured to said support arm and extending parallel to said shaft member, a pair of parallel auxiliary tool bars secured to the ends of said spaced bar members and located to substantially register with said first-named tool bars, and means on at least one of the auxiliary tool bars to receive an end of the main tool bar and to limit descent of the auxiliary tool bars relative to the main tool bars to positions wherein they substantially register horizontally with the main tool bars.

2. A cultivator frame extension attachment for a cultivator frame of the type comprising a pair of elongated spaced horizontal parallel main tool bars having means for supporting depending cultivator tools and adapted to be attached to a tractor, said extension attachment comprising at least one supporting shaft member, upstanding longitudinal flange means on the intermediate portion of said shaft member, means for rotatably mounting said shaft member transversely on the intermediate portions of said parallel tool bars, a support arm rigidly secured to said flange means perpendicularly thereto, whereby to extend between said parallel tool bars spaced bar members rigidly secured to said support arm and extending parallel to said shaft member, a pair of parallel auxiliary tool bars secured to the ends of said spaced bar members and located to substantially register with said first-named tool bars, means on at least one of the auxiliary tool bars to receive an end of a main tool bar and to limit descent of the auxiliary tool bars relative to the main tool bars to positions wherein they substantially register horizontally with the main tool bars, and a depending ground-engaging supporting wheel swivelly journaled to one of the auxiliary tool bars.

3. A cultivator frame extension attachment for a cultivator frame of the type comprising a pair of elongated spaced horizontal parallel main tool bars having means for supporting depending cultivator tools and adapted to be attached to a tractor, said extension attachment comprising at least one supporting shaft member, upstanding longitudinal flange means on the intermediate portion of said shaft member, means for rotatably mounting said shaft member transversely on the intermediate portions of said parallel tool bars, a support arm rigidly secured to said flange means perpendicularly thereto, whereby to extend between said parallel tool bars, spaced bar members rigidly secured to said support arm and extending parallel to said shaft member, a pair of parallel auxiliary tool bars secured to the ends of said spaced bar members, means to adjust the transverse spacing between said auxiliary tool bars so that they will substantially register with said first-named tool bars, and means on at least one of the auxiliary tool bars to receive an end of a main tool bar and to limit descent of the auxiliary tool bars relative to the main tool bars to positions wherein they substantially register horizontally with the main tool bars.

4. A cultivator frame extension attachment for a cultivator frame of the type comprising a pair of elongated spaced horizontal parallel main tool bars having means for supporting depending cultivator tools and adapted to be attached to a tractor, said extension attachment comprising at least one supporting shaft member, upstanding longitudinal flange means on the intermediate portion of said shaft member, means for rotatably mounting said shaft member transversely on the intermediate portions of said parallel tool bars, a support arm rigidly secured to said flange means perpendicularly thereto, whereby to extend between said parallel tool bars, spaced bar members rigidly secured to said support arm and extending parallel to said shaft member, a pair of parallel auxiliary tool bars secured to the ends of said spaced bar members, spacer block means at the connections of the auxiliary tool bars with the spaced bar members formed to adjust the transverse spacing between said auxiliary tool bars so that they will substantially register with said first-named tool bars, and means on at least one of the auxiliary tool bars to receive an end of a main tool bar and to limit descent of the auxiliary tool bars relative to the main tool bars to positions wherein they substantially register horizontally with the main tool bars.

5. A cultivator frame extension attachment for a cultivator frame of the type comprising a pair of elongated spaced horizontal parallel main tool bars having means for supporting depending cultivator tools and adapted to be attached to a tractor, said extension attachment comprising at least one supporting shaft member, upstanding longitudinal flange means on the intermediate portion of said shaft member, means for rotatably mounting said shaft member transversely on the intermediate portions of said parallel tool bars, a support arm rigidly secured to said flange means perpendicularly thereto, whereby to extend between said parallel tool bars, spaced bar members rigidly secured to said support arm and extending parallel to said shaft member, a pair of parallel auxiliary tool bars secured to the ends of said spaced bar members, means to adjust the transverse spacing between said auxiliary tool bars so that they will substantially register with said first-named tool bars, means on at least one of the auxiliary tool bars to receive an end of a main tool bar and to limit descent of the auxiliary tool bars relative to the main tool bars to positions wherein they substantially register horizontally with the main tool bars, and a depending ground-engaging supporting wheel swively journaled to one of the auxiliary tool bars.

6. A cultivator frame extension attachment for a cultivator frame of the type comprising a pair of elongated spaced horizontal parallel main tool bars having means for supporting depending cultivator tools and adapted to be attached to a tractor, said extension attachment comprising a pair of shaft members, an upstanding plate-like longitudinal flange on each shaft member extending continuously between its end portions, means to pivotally mount said shaft members parallel to each other on the intermediate portions of said parallel tool bars, a support arm rigidly secured to the intermediate portion of each flange perpendicularly thereto, whereby to extend between said parallel tool bars, spaced bar members rigidly secured to each support arm and extending parallel to said shaft members, respective pairs of parallel auxiliary tool bars secured to the ends of the spaced bar members associated with said support arms and located to substantially register with said first-named tool bars at opposite ends thereof, and means on the auxiliary tool bars to receive portions of the main tool bars and to limit descent of the auxiliary tool bars relative to the main tool bars to positions wherein they are substantially in horizontal registry.

7. A cultivator frame extension attachment for a cultivator frame of the type comprising a pair of elongated spaced horizontal parallel main tool bars having means for supporting depending cultivator tools and adapted to be attached to a tractor, said extension attachment comprising a pair of shaft members, an upstanding plate-like longitudinal flange on each shaft member extending continuously between its end portions, means to pivotally mount said shaft members parallel to each other on the intermediate portions of said parallel tool bars, a support arm rigidly secured to the intermediate portion of each flange perpendicularly thereto, whereby to extend between said parallel tool bars, spaced bar members rigidly secured to each support arm and extending parallel to said shaft members, respective pairs of parallel auxiliary tool bars secured to the ends of the spaced bar members associated with said support arms and located to substantially register with said first-named tool bars at opposite end portions thereof, means on the auxiliary tool bars to receive portions of the main tool bars and to limit descent of the auxilairy tool bars relative to the main tool bars to positions wherein they are substantially in horizontal registry, and respective depending ground-engaging supporting wheels swively journaled to the outer ends of the auxiliary tool bars registrable with one of the main tool bars.

References Cited by the Examiner

UNITED STATES PATENTS

| 1,105,022 | 7/14 | Cambell | 172—456 |
| 1,328,800 | 1/20 | Sherrod | 172—121 |
| 1,404,544 | 1/22 | Rettig | 172—456 |
| 1,621,295 | 3/27 | Wagner | 172—776 X |
| 2,298,161 | 10/42 | Robinson | 172—456 |
| 3,122,210 | 2/64 | French | 172—456 |

FOREIGN PATENTS

| 666,707 | 2/62 | Great Britain. |

ABRAHAM G. STONE, *Primary Examiner.*

RUSSELL R. KINSEY, T. GRAHAM CRAVER,
*Examiners.*